US012763813B2

(12) United States Patent
Tramoni

(10) Patent No.: US 12,763,813 B2
(45) Date of Patent: Oct. 13, 2026

(54) CONTROL VOLTAGE ADJUSTMENT

(71) Applicant: STMicroelectronics International N.V., Geneva (CH)

(72) Inventor: Alexandre Tramoni, Le Beausset (FR)

(73) Assignee: STMicroelectronics International N.V., Geneva (CH)

( * ) Notice: Subject to any disclaimer, the term of this patent is extended or adjusted under 35 U.S.C. 154(b) by 348 days.

(21) Appl. No.: 18/478,615

(22) Filed: Sep. 29, 2023

(65) Prior Publication Data

US 2024/0128997 A1 Apr. 18, 2024

(30) Foreign Application Priority Data

Oct. 18, 2022 (FR) ....................................... 2210719

(51) Int. Cl.

| | |
|---|---|
| ***H04B 5/72*** | (2024.01) |
| ***H02J 7/42*** | (2026.01) |
| ***H02J 50/23*** | (2016.01) |
| ***H04B 5/26*** | (2024.01) |

(52) U.S. Cl.

CPC .................. *H04B 5/72* (2024.01); *H02J 7/42* (2026.01); *H02J 50/23* (2016.02); *H04B 5/26* (2024.01)

(58) Field of Classification Search

CPC .... H04B 5/72; H04B 5/26; H04B 5/40; H02J 7/42; H02J 50/23; G05F 1/567

USPC ......................................................... 455/41.1

See application file for complete search history.

(56) References Cited

U.S. PATENT DOCUMENTS

| | | | | |
|---|---|---|---|---|
| 5,774,797 | A | 6/1998 | Kawano | |
| 7,698,578 | B2 * | 4/2010 | Williams | H03G 3/3042 713/323 |
| 10,326,193 | B2 | 6/2019 | Tramoni | |
| 10,368,204 | B2 * | 7/2019 | Nogueira-Nine | G01S 5/0027 |
| 2016/0127060 | A1 | 5/2016 | Cross | |
| 2018/0358680 | A1 | 12/2018 | Tramoni et al. | |
| 2019/0064892 | A1 | 2/2019 | Kim | |
| 2020/0076472 | A1 * | 3/2020 | Holweg | G06K 19/0773 |
| 2020/0211661 | A1 * | 7/2020 | Piccardi | G11C 16/0483 |
| 2024/0315661 | A1 * | 9/2024 | Artunduaga | A61B 7/04 |

FOREIGN PATENT DOCUMENTS

| | | | |
|---|---|---|---|
| CN | 106507453 | A | 3/2017 |
| CN | 109039387 | A | 12/2018 |
| CN | 111052035 | A | 4/2020 |
| CN | 221575618 | U | 8/2024 |
| EP | 1873913 | A1 | 1/2008 |
| EP | 3413473 | A1 | 12/2018 |
| JP | H08204587 | A | 8/1996 |
| JP | 2012010082 | A | 1/2012 |

* cited by examiner

*Primary Examiner* — Eugene Yun

(74) *Attorney, Agent, or Firm* — Slater Matsil, LLP

(57) ABSTRACT

An electronic device includes a power supply, such as a battery, configured to supply a power supply voltage. The device further includes a controllable voltage converter circuit configured to generate a control voltage based on the power supply voltage. A near-field communication device is included that has at least one antenna configured to emit an electromagnetic field having a power that is controllable by the control voltage. The electronic device further includes a temperature measuring device configured to measure a temperature. The controllable voltage converter circuit is configured to modify a value of the control voltage based on the measured temperature.

20 Claims, 5 Drawing Sheets

CONTROL VOLTAGE ADJUSTMENT

CROSS-REFERENCE TO RELATED APPLICATIONS

This application claims the priority benefit of French patent application number FR2210719, filed on Oct. 18, 2022, which is hereby incorporated by reference to the maximum extent allowable bylaw.

TECHNICAL FIELD

The present disclosure generally concerns electronic systems and devices, and particular embodiments relate to electronic systems and devices adapted to implementing wireless communications, such as near field communications (NFC).

BACKGROUND

Wireless communications are more and more used nowadays for different applications such as data exchanges, bank payments, energy exchanges, etc. There exist several types of wireless communications, for example, near-field communications (NFC), communications using high frequencies at longer distance such as Bluetooth communications, etc.

It would be desirable to be able to improve, at least partly, electronic devices implementing wireless communications, and more particularly, near-field communications.

SUMMARY

In various embodiments, the present disclosure provides electronic devices adapted to modify the characteristics of the wireless communication that they implement according to temperature.

Further, in various embodiments, electronic devices are provided that are adapted to modify the characteristics of the near-field communication that they implement according to temperature.

In various embodiments, electronic devices are provided that are adapted to modify the electromagnetic field that they emit according to temperature.

One or more embodiments of the present disclosure overcomes all or part of the disadvantages of known electronic devices adapted to implementing near-field communications.

In at least one embodiment, an electronic device is provided that includes a power supply configured to supply a power supply voltage. A controllable voltage converter circuit is configured to generate a control voltage based on the power supply voltage. A near-field communication device includes at least one antenna configured to emit an electromagnetic field having a power controllable by the control voltage. A temperature measuring device is configured to measure a temperature. The controllable voltage converter circuit is configured to modify a value of the control voltage based on the measured temperature.

According to at least one embodiment, at an initial state the control voltage is set based on the measured temperature.

According to at least one embodiment, the value of the control voltage is selectively controlled based on a lookup table.

According to at least one embodiment, at an initial state the control voltage is set to a maximum value.

According to at least one embodiment, the maximum value is approximately 8 V.

According to at least one embodiment, at an initial state the control voltage is set to a minimum value.

According to at least one embodiment, the minimum value is approximately 5 V.

According to at least one embodiment, after the initial state, if the temperature is higher than a threshold value, the value of the control voltage is decreased.

According to at least one embodiment, after the initial state, if the temperature is lower than a threshold temperature, the value of the control voltage is increased.

According to at least one embodiment, the temperature is periodically measured.

According to at least one embodiment, the temperature measurement period is in the range from 5 s to 1 min.

According to at least one embodiment, the at least one antenna is configured to emit the electromagnetic field after the value of the control voltage has been modified.

According to at least one embodiment, the power supply is a battery.

In at least one embodiment, a method is provided that includes: measuring a temperature of an electronic device, the electronic device including a battery and a controllable voltage converter circuit configured to generate a control voltage based on battery; adjusting the control voltage based on the measured temperature; and of a near-field communication device comprising at least one antenna configured to emit an electromagnetic field having a power controllable by the control voltage; and emitting, by at least one antenna of a near-field communication device of the electronic device, an electromagnetic field based on the adjusted control voltage.

In at least one embodiment, a method is provided that includes: supplying, by a power supply of an electronic device, a power supply voltage; generating, by a controllable voltage converter circuit of the electronic device, a control voltage based on the power supply voltage; emitting, by a near-field communication antenna of the electronic device, an electromagnetic field having a power controllable by the control voltage; measuring a temperature of the electronic device; and modifying, by the controllable voltage converter circuit, the control voltage based on the measured temperature.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may have similar or identical structural, dimensional and material properties.

For the sake of clarity, only the steps and elements that are useful for an understanding of the embodiments described herein have been illustrated and described in detail. In particular, near-field communication protocols are not described herein, usual near-field communication protocols are compatible with the embodiments described hereafter.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made, unless specified otherwise, to the orientation of the figures.

Unless specified otherwise, the expressions "around", "approximately", "substantially" and "in the order of" signify within 10%, and preferably within 5%.

Figure 1:
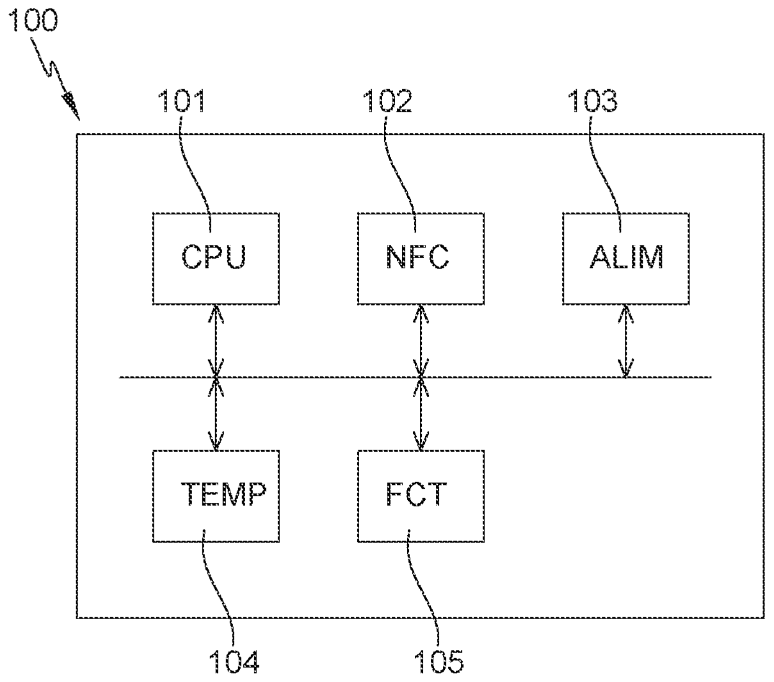
FIG. 1 is a block diagram illustrating an electronic device, in accordance with one or more embodiments.

FIG. 1 very schematically shows in the form of blocks an example of an electric device 100 to which the embodiments described in relation with FIGS. 3 to 6 may apply.

Device 100 is an electronic device adapted to implementing a wireless communication, and which is particularly adapted to implementing a near-field communication (NFC).

Device 100 comprises a processor 101 (CPU) enabling to process data. According to an example, device 100 may comprise a plurality of processors, each adapted to processing different types of data. According to a specific example, device 100 may comprise a main processor and one or a plurality of secondary processors.

Device 100 further comprises a near-field communication device (or "module") 102 (NFC), or NFC module (102). Near-field communication (NFC) technologies enable to carry out short-range high-frequency communications. Such systems use a radio frequency electromagnetic field emitted by a device (terminal or reader) to communicate with another device (distant module, transponder, or card). NFC module 102 comprises various electronic circuits adapted to emitting a radio frequency (RF) signal transmitted by means of an electromagnetic field emitted by an antenna of an oscillating/resonating circuit. Circuits contained in module 102 are described in further detail in relation with FIG. 2.

Device 100 further comprises one or a plurality of circuits 103 (ALIM) taking charge of the energy supply of device 100. According to an example, circuits 103 may comprise one or a plurality of batteries, energy conversion circuits, charge circuits, etc. According to an embodiment, circuits 103 comprise at least one battery delivering a power supply voltage used to control NFC module 102. Circuits contained in circuits 103 are described in further detail in relation with FIG. 2.

Device 100 further comprises one or a plurality of temperature measuring devices 104 for measuring the temperature (TEMP). According to a first example, the temperature measuring devices 104 are hardware devices, for example, one or a plurality of temperature circuits, or temperature sensors. According to a second example, the temperature measuring devices 104 are software temperature measurement devices or means, for example, which may be implemented by a microprocessor or the like to determine the temperature (TEMP). The temperature measuring device 104 may be for example adapted to measuring the ambient temperature surrounding device 100, and/or adapted to measuring the temperature at the level of the elements forming device 100, such as for example the temperature at the level of NFC module 102.

Device 100 further comprises one or a plurality of circuits 105 (FCT) implementing one or a plurality of functionalities of device 100. According to an example, circuits 105 may comprise memories, specific data processing circuits, such as cipher circuits, circuits enabling to perform measurements, input/output circuits of device 100.

Device 100 further comprises one or a plurality of communication buses 106 enabling all the circuits of device 100 to communicate. In FIG. 1, a single bus 106 coupling processor 101, module 102, and circuits 103 to 105 is shown, but in practice, device 100 may comprise a plurality of communication buses coupling these different elements.

Figure 2:
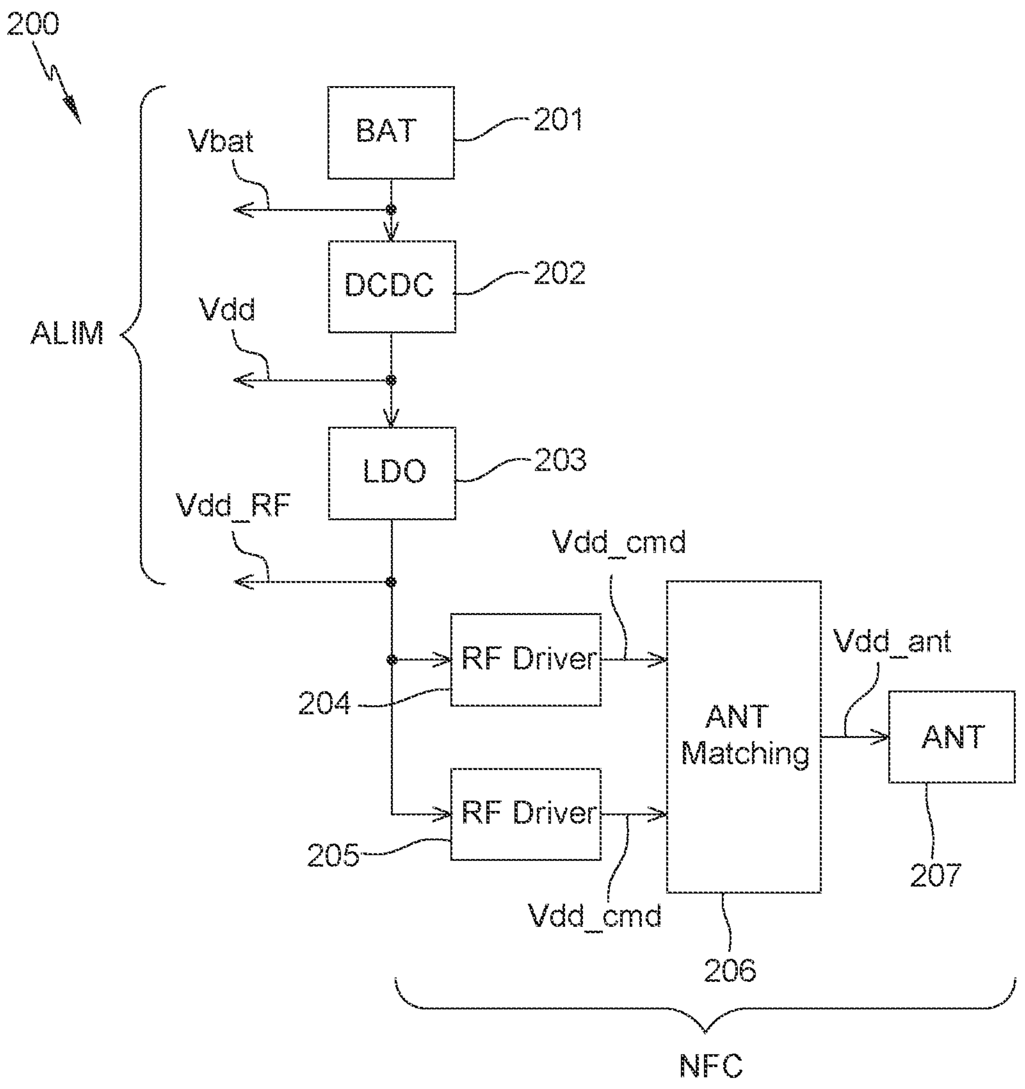
FIG. 2 is a block diagram illustrating a portion of the electronic device of FIG. 1, in accordance with one or more embodiments.

FIG. 2 very schematically shows in the form of blocks a portion 200 of the device 100 described in relation with FIG. 1.

Portion 200 corresponds to a portion of the NFC module 102 of device 100 and to a portion of the power supply circuits 103 of device 100. More particularly, portion 200 corresponds to the portion of device 100 enabling to deliver an electromagnetic field via an antenna.

As previously mentioned, portion 200 comprises a portion ALIM of power supply circuits 102. This portion ALIM comprises:

a battery 201 (BAT);

a voltage converter circuit 202 (DCDC); and a voltage regulator circuit 203 (LDO).

Battery 201 is one of the batteries of device 100. According to an example, battery 201 is the main battery of device 100. According to another example, battery 201 is a battery dedicated to the power supply of NFC module 102. Battery 201 is adapted to delivering a power supply voltage Vbat. Power supply voltage Vbat is for example in the range from 1 to 7 V, for example, from 2.6 to 5.1 V.

Voltage converter circuit 202, or converter 202, is adapted to converting a DC voltage into another DC voltage. More particularly, circuit 202 is a boost converter, that is, a converter adapted to delivering, based on a first DC voltage, a second DC voltage having a value higher than that of the first voltage. Converter 202 is adapted to delivering a control voltage Vdd based on the power supply voltage Vbat delivered by battery 201. Further, and according to an embodiment, converter 202 is a controllable converter, that is, a converter having a controllable output value, here control voltage Vdd. More particularly, converter 202 is adapted to outputting control voltage Vdd, having a value that can vary, according to the received control signal, between a minimum value Vddmin and a maximum value Vddmax. According to an example, converter 202 is adapted to outputting a voltage in the range from 5 to 10 V, for example from 6 to 8 V.

Voltage regulator circuit 203, or regulator 203, is a linear regulator of a DC voltage receiving the control voltage Vdd delivered by converter 202. Regulator 203 outputs a voltage Vdd_RF corresponding to the difference between control voltage Vdd and a threshold voltage Vldo. According to an example, threshold voltage Vldo is in the order of 0.2 V. According to embodiment, regulator 203 is optional. Regulator 203 may enable to suppress the noise present on control voltage Vdd.

As previously mentioned, portion 200 comprises a NFC portion of the NFC module. This NFC portion comprises:

driver circuits 204 (RF Driver) and 205 (RF Driver);

an impedance matching circuit (ANT Matching) 206; and an antenna 207 (ANT).

Driver circuits 204 and 205 are circuits for driving antenna 207. Circuits 204 and 205 receive the output voltage Vdd_RF of regulator 202, or control voltage Vdd, when regulator 202 is omitted, and deliver an adapted control voltage Vdd_cmd.

Impedance matching circuit (ANT Matching) 206 receives adapted control voltages Vdd_cmd of driver circuits 204 and 205, and outputs an antenna control voltage Vdd_Ant having its impedance matched with the impedance of antenna 207. Voltage Vdd_Ant is dependent on the adapted control voltages Vdd_cmd, having their value depending on voltage Vdd_RF, or possibly directly on voltage Vdd.

Antenna 207 is adapted to emitting an electromagnetic field enabling to implement a near-field communication. Thus, antenna 207 is adapted to emitting and to receiving electromagnetic waves having a frequency comprised within the radio frequency range, that is, having a frequency in the range from 3 kHz to 300 kHz. According to an example, antenna 207 is adapted to transmitting and to receiving electromagnetic waves having a frequency in the order of 13.56 MHz. Antenna 207 receives voltage Vdd_Ant, and outputs an electromagnetic field having a power depending on the value of control voltage Vdd_Ant and thereby depending on the value of the control voltage Vdd delivered by converter 202.

Figure 3:
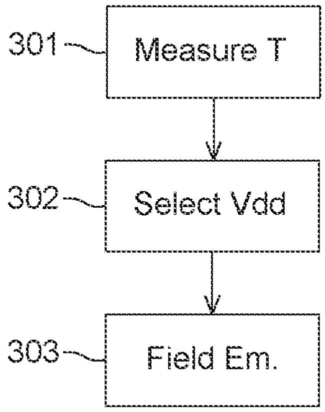
FIG. 3 is a block diagram illustrating a first implementation mode of a voltage adaptation method, in accordance with one or more embodiments.

FIG. 3 is a block diagram illustrating a first implementation mode of a method of adapting the control voltage Vdd, described in relation with FIG. 2, of the device 100 described in relation with FIG. 1.

At an initial step 301 (Measure T), corresponding to an initial state, antenna 207 emits no electromagnetic field, but receives a request indicating that it must emit one to implement a NFC communication. Antenna 207 thus receiving an order to emit an electromagnetic field, the temperature measuring device 104 of device 100 is implemented to measure the temperature of device 100, which corresponds, in this case, to the ambient temperature Tamb around device 100, since the NFC module is not in operation and thus generates no heat.

At a step 302 (Select Vdd), subsequent to step 301, the value of the control voltage Vdd delivered by converter 202 is selected according to the measured value of temperature T, and thus the power of the field to be emitted by antenna 207 is selected according to the temperature. For this purpose, device 100 may use a lookup table indicating the appropriate voltage value for the delivered voltage Vdd. Once the value of voltage Vdd has been selected, converter 202 is controlled to deliver the value in question.

At a step 303 (Field Em.), subsequent to step 302, voltage value Vdd being set, antenna 207 may start emitting an electromagnetic field having its power configured by using Vdd as described in relation with FIG. 2.

An advantage of this embodiment is that it enables to avoid overheating of device 100. Indeed, emitting an electromagnetic field at full power may cause an increase in the temperature of the circuits and components of device 100, decreasing its power when the temperature is already high enables to avoid still further increasing this temperature.

Figure 4:
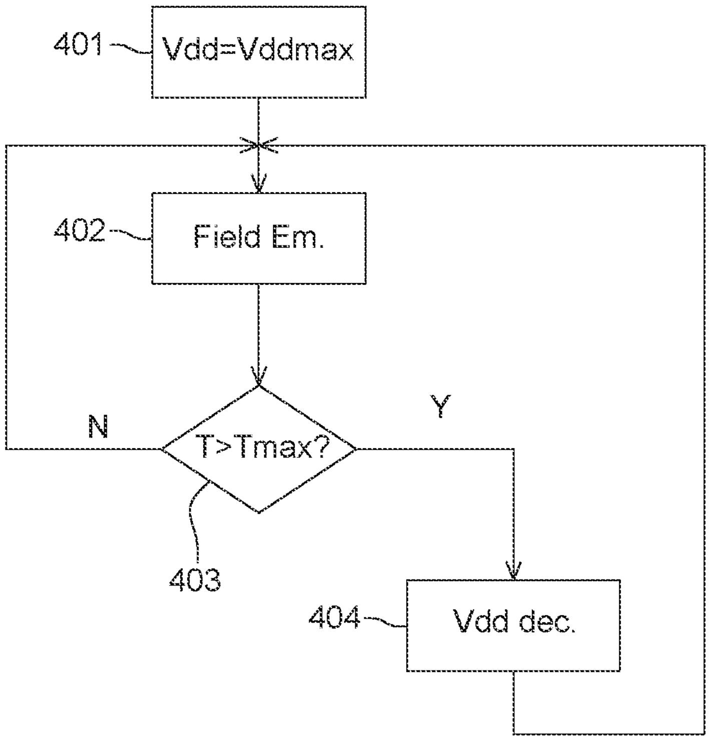
FIG. 4 is a block diagram illustrating a second implementation mode of a voltage adaptation method, in accordance with one or more embodiments.

FIG. 4 is a block diagram illustrating a second implementation mode of a method of adapting the control voltage Vdd, described in relation with FIG. 2, of the device 100 described in relation with FIG. 1.

At an initial step 401 (Vdd=Vddmax), corresponding to an initial state, antenna 207 emits no electromagnetic field, but receives a request indicating that it must emit one to implement a NFC communication. Antenna 207 thus receiving an order to emit an electromagnetic field, control voltage Vdd is set to its maximum value Vddmax. For this purpose, converter 202 is controlled to deliver the voltage value in question.

At a step 402 (Field Em.), subsequent to step 401, voltage value Vdd being set, antenna 207 may start emitting an electromagnetic field having its power configured by using Vdd as described in relation with FIG. 2.

At a step 403 (T>Tmax), subsequent to step 402, antenna 207 emits an electromagnetic field, and the temperature T of device 100 is measured by the temperature measuring device 104. This temperature T is compared with a threshold temperature (e.g., maximum temperature) Tmax. According to an embodiment, this step takes place periodically, for example, every 5 s to 1 min. If temperature T is lower than maximum temperature Tmax (output Y of step 403), then the device keeps on operating with no modification, and if temperature T becomes higher than maximum temperature Tmax (output N of step 403), the next step is a step 404 (Vdd dec.).

At step 404, the power of the electromagnetic field emitted by antenna 207 is decreased by decreasing voltage Vdd. For this purpose, a control signal is sent to converter circuit 202. According to an example, control voltage Vdd is decreased by steps, for example by steps of 0.8 V.

This second implementation mode has the same advantage as the first implementation mode described in relation with FIG. 4, but also has the advantage of allowing an adaptation of the power of the electromagnetic field during the emission of said field.

Figure 5:
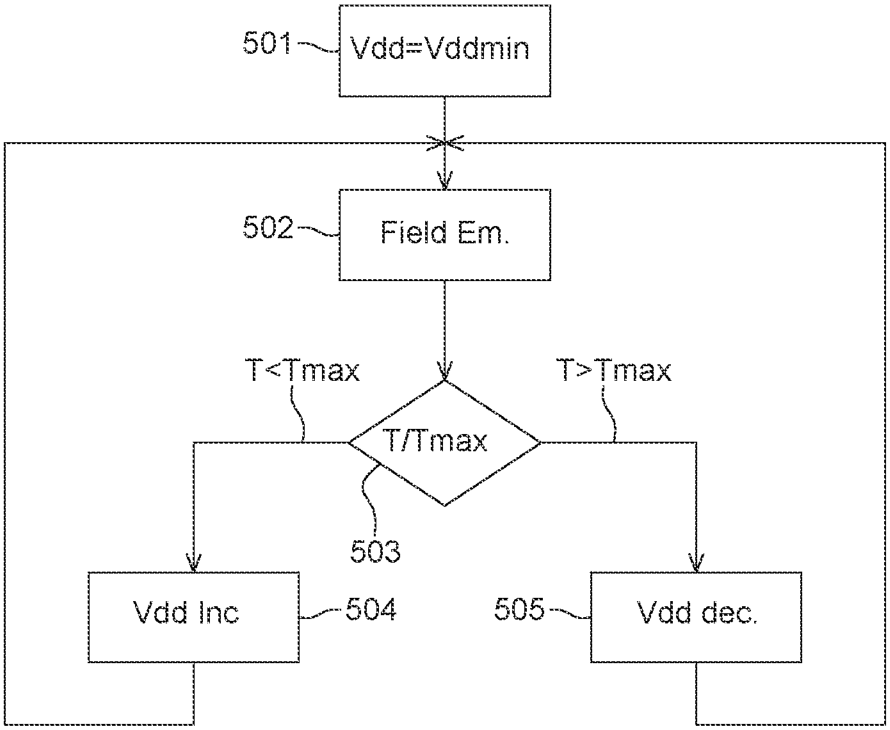
FIG. 5 is a block diagram illustrating a third implementation mode of a voltage adaptation method, in accordance with one or more embodiments.

FIG. 5 is a block diagram illustrating a third implementation mode of a method of adapting the control voltage Vdd, described in relation with FIG. 2, of the device 100 described in relation with FIG. 1.

At an initial step 501 (Vdd=Vddmin), corresponding to an initial state, antenna 207 emits no electromagnetic field, but receives a request indicating that it must emit one to implement a NFC communication. Antenna 207 thus receiving an order to emit an electromagnetic field, control voltage Vdd is set to its minimum value Vddmin. For this purpose, converter 202 is controlled to deliver the voltage value in question.

At a step 502 (Field Em.), (Field Em.), subsequent to step 501, voltage value Vdd being set, antenna 207 may start emitting an electromagnetic field having its power configured by using Vdd as described in relation with FIG. 2.

At a step 503 (T/Tmax), subsequent to step 402, antenna 207 emits an electromagnetic field, and the temperature T of device 100 is measured by the temperature measuring device 104. This temperature T is compared with a maximum temperature Tmax. According to an embodiment, this step takes place periodically, for example, every 5 s to 1 min. If temperature T is lower than maximum temperature Tmax (output T<Tmax of step 503), then the next step is a step 504 (Vdd inc.), and if temperature T becomes higher than maximum temperature Tmax (output T>Tmax of step 503), the next step is a step 505 (Vdd dec.).

At step 504, the power of the electromagnetic field emitted by antenna 207 is increased by increasing voltage Vdd. For this purpose, a control signal is sent to converter circuit 202. According to an example, control voltage Vdd is increased by steps, for example, by steps of 0.8 V.

At step 505, the power of the electromagnetic field emitted by antenna 207 is decreased by decreasing voltage Vdd. For this purpose, a control signal is sent to converter circuit 202. According to an example, control voltage Vdd is decreased by steps, for example by steps of 0.8 V.

This third implementation mode has the same advantages as the first and second implementation modes described in relation with FIGS. 4 and 5.

Figure 6:
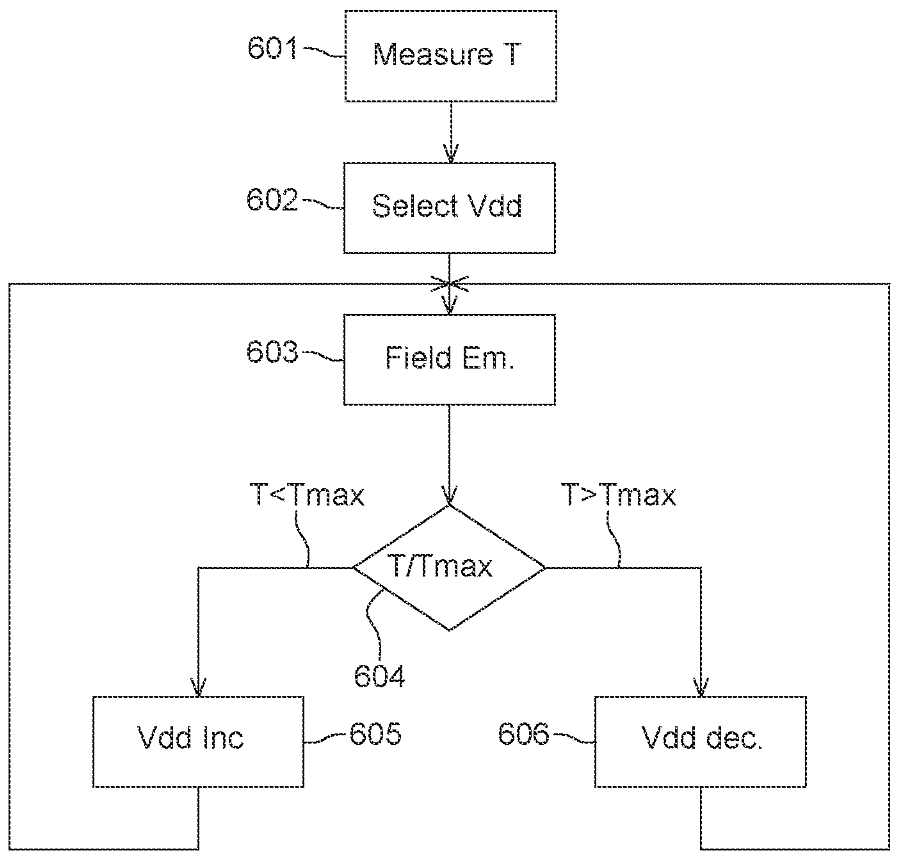
FIG. 6 is a block diagram illustrating a fourth implementation mode of a voltage adaptation method, in accordance with one or more embodiments.

FIG. 6 is a block diagram illustrating a fourth implementation mode of a method of adapting the control voltage Vdd, described in relation with FIG. 2, of the device 100 described in relation with FIG. 1.

At an initial step 601 (Measure T), corresponding to an initial state, antenna 207 emits no electromagnetic field, but receives a request indicating that it must emit one to implement a NFC communication. Antenna 207 thus receiving an order to emit an electromagnetic field, the temperature measuring device 104 of device 100 are implemented to measure the temperature of device 100, here corresponding to the room temperature as in the implementation mode of FIG. 3.

At a step 602 (Select Vdd), subsequent to step 601, the value of control voltage Vdd delivered by converter 202 is selected according to the value of the measured temperature T. For this purpose, device 100 may use a lookup table indicating the appropriate voltage value for the delivered voltage Vdd. Once the value of voltage Vdd has been selected, converter 202 is controlled to deliver the value in question.

At a step 603 (Field Em.), subsequent to step 602, voltage value Vdd being set, antenna 207 may start emitting an electromagnetic field having its power configured by using Vdd as described in relation with FIG. 2.

At a step 604 (T/Tmax), subsequent to step 603, antenna 207 emits an electromagnetic field, and the temperature T of device 100 is measured by the temperature measuring device 104. This temperature T is compared with a maximum temperature Tmax. According to an embodiment, this step takes place periodically, for example, every 5 s to 1 min. If temperature T is lower than maximum temperature Tmax (output T<Tmax of step 604), then the next step is a step 605 (Vdd inc.), and if temperature T becomes higher than maximum temperature Tmax (output T>Tmax of step 604), the next step is a step 606 (Vdd dec.).

At step 605, the power of the electromagnetic field emitted by antenna 207 is increased by increasing voltage Vdd. For this purpose, a control signal is sent to converter circuit 202. According to an example, control voltage Vdd is increased by steps, for example, by steps of 0.8 V.

At step 606, the power of the electromagnetic field emitted by antenna 207 is decreased by decreasing voltage Vdd. For this purpose, a control signal is sent to converter circuit 202. According to an example, control voltage Vdd is decreased by steps, for example by steps of 0.8 V.

This fourth implementation mode has the same advantages as the first, second, and third implementation modes described in relation with FIGS. 4 to 6.

Various embodiments and variants have been described. Those skilled in the art will understand that certain features of these various embodiments and variants may be combined, and other variants will occur to those skilled in the art. In particular, the implementation mode of FIG. 4 may comprise a step of decrease of control voltage Vdd like the implementation mode of FIG. 5.

Finally, the practical implementation of the described embodiments and variations is within the abilities of those skilled in the art based on the functional indications given hereabove.

What is claimed is:

1. An electronic device, comprising:

a battery configured to supply a power supply voltage;

a controllable boost voltage converter circuit configured to generate, based on the power supply voltage, a control voltage having a value higher than the power supply voltage;

a near-field communication device comprising at least one antenna configured to emit an electromagnetic field having a power controllable by the control voltage; and a temperature measuring device configured to measure a temperature of the near-field communication device, wherein the controllable boost voltage converter circuit is configured to modify a value of the control voltage based on the measured temperature; and wherein the battery, the controllable boost voltage converter circuit, the near-field communication device, and the temperature measuring device are coupled to a common communication bus.

2. The device of claim 1, wherein at an initial state, the control voltage is set based on the measured temperature.

3. The device of claim 2, wherein the value of the control voltage is selectively controlled based on a lookup table.

4. The device of claim 1, wherein at an initial state, the control voltage is set to a maximum value.

5. The device of claim 4, wherein the maximum value is approximately 8 V.

6. The device of claim 1, wherein at an initial state, the control voltage is set to a minimum value.

7. The device of claim 6, wherein the minimum value is approximately 5 V.

8. The device of claim 1, wherein, after an initial state, if the temperature is higher than a threshold temperature, the value of the control voltage is decreased.

9. The device of claim 1, wherein, after an initial state, if the temperature is lower than a threshold temperature, the value of the control voltage is increased.

10. The device of claim 1, wherein the temperature is periodically measured during operation.

11. The device of claim 10, wherein a temperature measurement period is in a range from 5 s to 1 min.

12. The device of claim 1, wherein the at least one antenna is configured to emit the electromagnetic field after the value of the control voltage has been modified.

13. The device of claim 1, wherein the battery is configured to supply the power supply voltage directly to the controllable boost voltage converter circuit, and wherein the controllable boost voltage converter circuit is configured to supply the control voltage directly to the near-field communication device.

14. A method, comprising:

measuring a temperature of a near-field communication device of an electronic device, the electronic device including a battery configured to supply a power supply voltage and a controllable boost voltage converter circuit configured to generate a control voltage having a value higher than the power supply voltage, wherein the battery, the controllable boost voltage converter circuit, the near-field communication device, and a temperature measuring device performing the measuring are coupled to a common communication bus of the electronic device;

adjusting, by the controllable boost voltage converter circuit, the control voltage based on the measured temperature; and emitting, by at least one antenna of the near-field communication device, an electromagnetic field having a power controllable by the adjusted control voltage.

15. The method of claim 14, further comprising setting the control voltage at an initial state based on the measured temperature.

16. The method of claim 15, wherein setting the control voltage at the initial state further comprises setting the control voltage based on a lookup table.

17. The method of claim 14, further comprising decreasing the value of the control voltage in response to the temperature, at an initial state, being higher than a threshold temperature.

18. The method of claim 14, further comprising increasing the value of the control voltage in response to the temperature, at an initial state, being lower than a threshold temperature.

19. A method, comprising:

supplying, by a battery of an electronic device, a power supply voltage;

generating, by a controllable boost voltage converter circuit of the electronic device, based on the power supply voltage, a control voltage having a value higher than the power supply voltage;

emitting, by a near-field communication antenna of a near-field communication device of the electronic device, an electromagnetic field having a power controllable by the control voltage;

measuring, by a temperature measuring device of the electronic device, a temperature of the near-field communication device of the electronic device; and modifying, by the controllable boost voltage converter circuit, the control voltage based on the measured temperature, wherein the battery, the controllable boost voltage converter circuit, the near-field communication device, and the temperature measuring device are coupled to a common communication bus of the electronic device.

20. The method of claim 19, further comprising:

comparing, after an initial state, the measured temperature to a threshold temperature; and decreasing the value of the control voltage in response to the measured temperature being greater than the threshold temperature, or increasing the value of the control voltage in response to the measured temperature being less than the threshold temperature.

* * * * *